United States Patent
Smith et al.

(10) Patent No.: US 6,556,339 B2
(45) Date of Patent: Apr. 29, 2003

(54) NONCOLLINEARLY PUMPED SOLID STATE RAMAN LASER

(75) Inventors: Duane Donald Smith, Louisville, CO (US); Glenn Taylor Bennett, Boulder, CO (US); AnnMarie Louise Oien, Boulder, CO (US); Timothy William Monarski, Lafayette, CO (US)

(73) Assignee: Coherent Technologies, Inc., Boulder, CO (US)

( * ) Notice: Subject to any disclaimer, the term of this patent is extended or adjusted under 35 U.S.C. 154(b) by 0 days.

(21) Appl. No.: 09/822,700

(22) Filed: Mar. 30, 2001

(65) Prior Publication Data

US 2003/0043453 A1 Mar. 6, 2003

(51) Int. Cl.[7] .................................................. H01S 3/30
(52) U.S. Cl. ..................................................... 359/334
(58) Field of Search ............................... 359/334; 372/3

(56) References Cited

U.S. PATENT DOCUMENTS

| | | | |
|---|---|---|---|
| 3,597,624 A | * 8/1971 | Weiner | 372/3 |
| 3,624,421 A | 11/1971 | Pantell et al. | |
| 3,869,618 A | * 3/1975 | Lax et al. | 359/327 |
| 3,983,406 A | * 9/1976 | Lax et al. | 359/326 |
| 4,785,459 A | * 11/1988 | Baer | 372/101 |
| 4,821,272 A | 4/1989 | Bruesselbach et al. | |
| 4,916,712 A | * 4/1990 | Bender | 372/100 |
| 4,996,693 A | * 2/1991 | Case et al. | 372/108 |
| 5,193,095 A | 3/1993 | Tashiro et al. | |
| 5,251,221 A | 10/1993 | Stultz et al. | |
| 5,258,988 A | 11/1993 | Whittley | |
| 5,265,106 A | 11/1993 | Garcia et al. | |
| 5,293,394 A | 3/1994 | Whittley | |
| 5,455,838 A | * 10/1995 | Heritier et al. | 372/35 |
| 5,463,649 A | * 10/1995 | Ashby et al. | 359/343 |
| 5,546,222 A | * 8/1996 | Plaessmann et al. | 359/346 |
| 5,548,608 A | * 8/1996 | Zhang | 372/70 |
| 5,673,281 A | * 9/1997 | Byer | 372/10 |
| 5,684,621 A | * 11/1997 | Downing | 359/326 |
| 5,900,967 A | * 5/1999 | Zamel | 359/337 |
| 5,991,315 A | * 11/1999 | Injeyan et al. | 372/11 |

FOREIGN PATENT DOCUMENTS

| | | | | |
|---|---|---|---|---|
| EP | 0579998 A1 | * | 2/1993 | H01S/3/08 |
| EP | 393528 B1 | | 8/1994 | |
| EP | 524020 B1 | | 9/1994 | |
| EP | 518735 B1 | | 5/1995 | |

OTHER PUBLICATIONS

N. Bloembergen et al., Controlled Stimulated Raman Amplification and Oscillation in Hydrogen Gas, Journal of Quantum Electronics, May 1, 1967, pp. 197–201, vol. QE–3, No. 5, Published in: Massachusetts.

(List continued on next page.)

*Primary Examiner*—Thomas G. Black
*Assistant Examiner*—Stephen Cunningham
(74) *Attorney, Agent, or Firm*—James R. Young (57) ABSTRACT

A noncollinear pumped solid state Raman laser or amplifier has a pump laser that transversely or noncollinearly pumps a solid state Raman gain material, with an intensity sufficient to produce a stimulated Raman laser output beam. The pump beam and the Raman beam are noncollinear when the Raman beam travels completely across the pump beam within the Raman gain material, or where the Raman beam completely separates physically, at some location in the pumped Raman gain material, from a virtual beam, which is collinear to the pump beam axis, and which has the same entrance spot size and beam divergence as the Raman beam. The device enhances the pump laser beam spatial homogenization to improve the wavefront smoothness and propagation performance from the pump beam to the Raman beam. Other configurations of the device have a plurality of mirrors, or prisms to fold the pump beam to cause the pump beam to pass through the Raman material a plurality of times, which increases the energy transferred from the pump beam to the Raman beam.

44 Claims, 8 Drawing Sheets

OTHER PUBLICATIONS

Dennis, J.H., Tannenwald, P.E., Stimulated Raman Emission at 90 Degrees to the Ruby Beam, Applied Physics Letters, Aug. 1, 1964, pp. 58–60, vol. 5, No. 3, Publisher: Massachusetts Institute of Technology, Published in: Massachusetts.

A. Z. Grasyuk, Raman Lasers, Sov. J. Quant. Eletron, Sep. 1, 1974, pp. 269–282, vol. 4, No. 3, Published in: US.

S.N. Karpukhin, A.I. Stepanov, Generation of Radiation in a Resonator Under Conditions of Stimulated Raman Scattering, Sov. J. Quantum Electron, Aug. 1986, pp. 1027–1031, vol. 16, No. 8, Publisher: American Institute of Physics, Published in: US.

Orlov et al. "Novel schemes of slab solid–state lasers" CLOE Sep. 14–18, 1998 p. 163.*

Murray et al. "Applications of solid–state Raman lasers" LEOS Nov. 10–13, 1997 pp. 537–538.*

Bobbs et al. "Phase–Matched Broad–Band Raman amplifiers" IEEE J of Q Elec. vol. 30. No. 8 Aug. 1994 pp. 1896–1906.*

* cited by examiner

NONCOLLINEARLY PUMPED SOLID STATE RAMAN LASER

FIELD OF THE INVENTION

This invention relates to lasers, and in particular to Raman lasers. Even more particularly, the invention relates to solid state Raman lasers and amplifiers pumped noncollinearly.

BACKGROUND OF THE INVENTION

The Raman scattering process involves frequency shifting of light, and perhaps changing the light's propagation direction, as light passes through a Raman material and scatters from lattice vibrations. The energy difference between the incident and scattered light creates or annihilates a vibration within a molecule (localized vibration) or lattice mode (delocalized vibration) of the material. These vibrations are quantized, and termed phonons, in analogy to photons. Phonons are similar to photons in that they are wavepackets defined by wave vectors and dispersion relations. One difference between phonons and photons is that the energy of a phonon is a collective mechanical eigenmode (physical vibration), whereas the energy of a photon is in the field, rather than matter. Since light is an electromagnetic vibration, it can travel outside any physical material, for example radio waves travel in space to satellites. Phonons, however, need a vibrating material to exist, and therefore only exist and travel in a material, which can be gaseous, liquid, solid or plasma.

The stimulated Raman scattering process is negligible at low intensity light levels. The process is dependent on incident light intensities, and only becomes significant when the Raman material is illuminated, or pumped, with light intensities usually attainable only with a very bright laser. Once the phonon is created or annihilated, it may be itinerant (or not) and dissipates finally as heat, due to scattering from other phonons, electrons or collective modes of the media.

Figure 1:
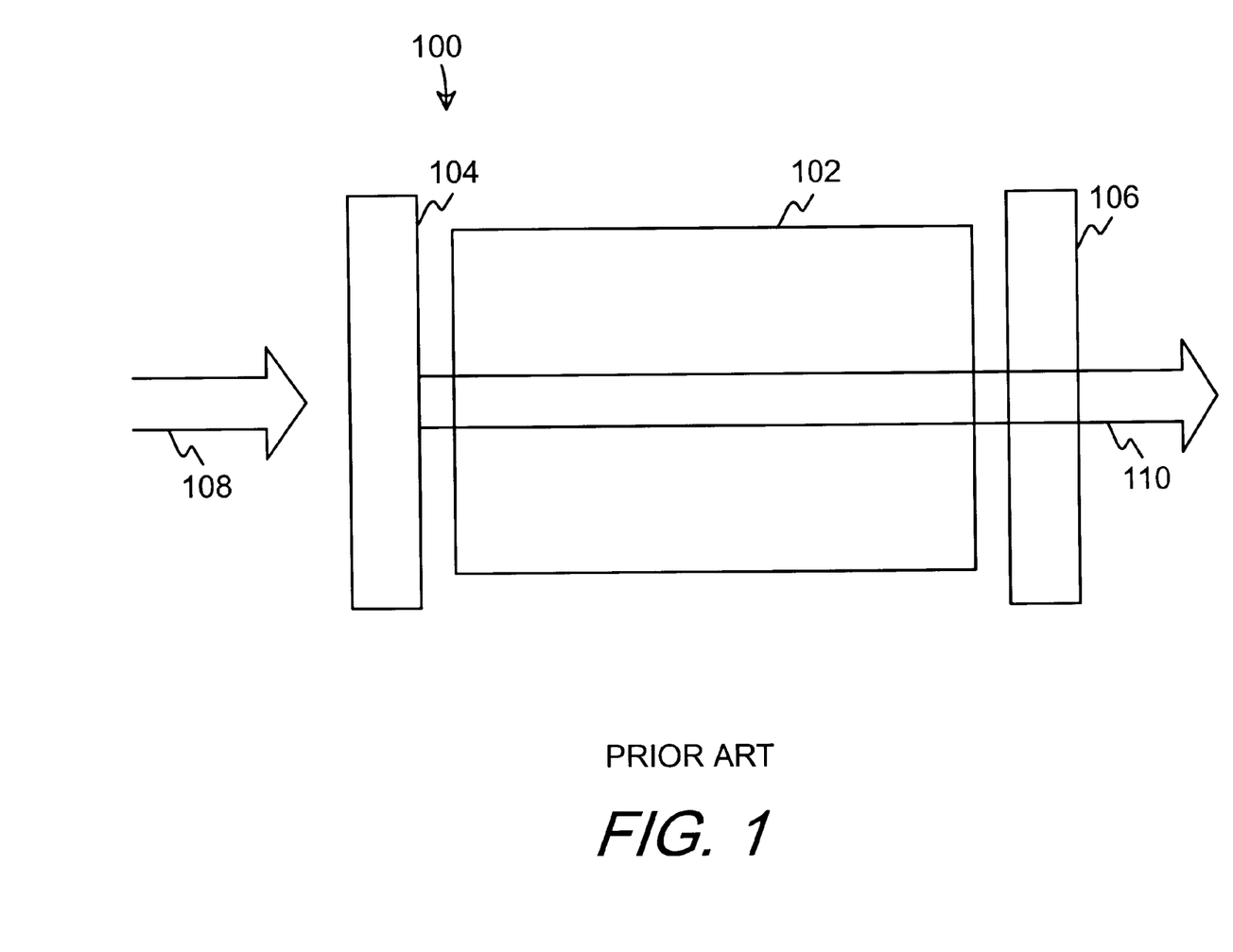
FIG. 1 shows a prior art collinearly pumped Raman laser.

Different materials exhibit varying propensities for Raman scattering of photons. This is characterized by a spontaneous Raman scattering cross-section, which is a probability that a certain length of material will scatter incoming light. Within a material there are often several types of phonons or vibration modes, each with a specific energy. Often one (or a few) phonons have Raman scattering cross-sections that dominate the rest, so the majority of the incident light energy excites one (or a few) phonon eigenmodes, so the scattered light is at one (or a few) new wavelength(s). If enough photons are scattered, they can start enhancing the formation of even more scattered photons, called Stokes (red shift) or anti-Stokes (blue shift) photons, which is called stimulated Raman scattering. This stimulated process can convert nearly all of the pump or incident light into scattered or Stokes light. If the Stokes/Anti-Stokes light is contained between one or two mirrors, the light intensity can build up further, enhancing the stimulated conversion, thus forming a Raman laser. FIG. 1 shows an example of a prior art collinear pumped Raman laser 100. A Raman material 102 has a Raman resonator placed around it consisting of aligned mirrors 104 and 106. A pump beam 108 enters through mirror 104, which is highly transmissive at the pump wavelength and highly reflective at the Raman wavelength. A stimulated Raman beam 110 is produced and is partially transmitted through mirror 106, a Raman laser output coupler (that is, a mirror partially transparent at the Raman wavelength).

The prior art in noncollinear pumped Raman lasers has consisted entirely of using gas and liquid Raman media. Gases that exhibit Raman scattering include hydrogen, a simple two-atom molecule. Liquids that scatter include nitrogen, which also has a diatomic molecule. In gases and liquids, the molecules that vibrate are not held at specific positions in space, and are continually moving, colliding and rotating, ensuring that any pump light incident upon the fluid encounters molecules at all possible orientations. In a solid, different pump light directions will encounter different molecular orientations, which can cause the scattering efficiency to change with pump light direction.

Polarization of photons and phonons occurs differently. For a photon, polarization is the direction of the vibration of the electromagnetic field as the photon travels, which can vary but it is always at right angles to the photon movement. For a phonon, there is no restriction on the angle between the direction of movement and the direction of vibration. If the vibration is along the overall phonon direction, the phonon is called a longitudinal optical or LO phonon. If the vibration is at right angles to the wave vector, like a photon, the phonon is called a transverse optical or TO phonon. Phonons can also be partially TO and LO if the polarization is at some acute angle to the wave vector, for example 45 degrees. A TO phonon can in some cases be considered similar in behavior to a photon. Optical phonons are described as "Raman active", as they contribute to Raman scattering, but TO phonons in particular can in some materials also be "infrared active". The latter type of TO phonon can also be called a polariton, if it is exceptionally strongly coupled to the radiation field; the polariton exhibits similar behavior to photons. This invention is only concerned with Raman active and infrared inactive optical phonons, which are constant in frequency as the angle between the pump and Raman laser beams change in the Raman material.

An acoustic phonon is a delocalized vibration throughout the material, similar to acoustic waves, and an acoustic phonon does not contribute to Raman scattering. Acoustic phonons behave similarly to optical phonons, except that acoustic phonons tend to have much smaller energies. The acoustic phonon conversion process is often termed Brillouin Scattering. Noncollinear Brillouin scattering also occurs, much as noncollinear Raman scattering does, but it tends to involve phase-matched scattering.

A Raman Laser review article by A. Z. Grasyuk published in the Sov. J. Quant. Electron. Volume 4, Number 3, September 1974, on p. 272, discusses noncollinear pumping of solid state material as a possibility, without describing the type of material to be excited and without providing any enabling details of how such a device would be constructed.

In "Controlled Stimulated Raman Amplification and Oscillation in Hydrogen Gas", by Bloembergen, et al., published in the Journal of Quantum Electronics, Vol. QE-3, No. 5, May 1967, the author refers to "transverse" or noncollinear pumping in hydrogen, but does not state that transverse pumping can be done in solid state materials.

To date, the demonstrated advantages of noncollinearly pumped Raman lasers (discussed below) have not been combined with the advantage of utilizing solid state Raman materials. Solid state materials can be much smaller in size than the equivalent gas or liquid system, and they do not require a transparent container or cell. Thus, there is a need in the art for a solid state Raman laser. There is a further need in the art for a noncollinearly pumped solid-state Raman laser. The present invention meets these and other needs in the art.

SUMMARY OF THE INVENTION

It is an aspect of the present invention to project a pump beam into a solid-state material to produce a noncollinear Raman laser beam from the solid-state material.

It is another aspect of the invention to pass the pump laser beam through the solid-state Raman material a plurality of times, which can compress the pump laser pulse length to a shorter Raman laser pulse length.

Another aspect of the invention is to integrate out wavefront irregularities of the pump beam while scattering into the Raman beam, improving propagation performance of the output Raman laser beam.

A further aspect of the invention is to project pump beams from a plurality of pump lasers into the solid state Raman material, forming a single combined Raman laser output.

The above and other aspects of the invention are accomplished in a device that comprises a pump laser transversely or noncollinearly pumping a solid state Raman gain material, with an intensity sufficient to produce a stimulated Raman laser output beam. The pump beam and the Raman beam are noncollinear when the Raman beam travels completely across the pump beam within the Raman gain material, or where the Raman beam completely separates physically, at some location in the pumped Raman gain material, from a virtual beam, which is collinear to the pump beam axis, and which has the same entrance spot size and beam divergence as the Raman beam.

The device further comprises a plurality of mirrors, or prisms, to fold the pump beam to cause the pump beam to pass through the Raman material a plurality of times. This increases the energy transferred from the pump beam to the Raman beam by lowering the Raman laser threshold and providing additional spatial and temporal averaging of the pump laser beam.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

In any material there is a probability that light passing through the material will be inelastically scattered off groups of atoms in the lattice of the material. This scattering is a Raman scattering process if the incident photon loses or gains some energy to an optical phonon, a quantized vibration of a molecule or crystal lattice of the material. The scattered photon, called a Stokes/Anti-Stokes photon, then contains the remaining energy, the amount of which depends on the material and type of excitation. The Raman interaction between the pump, Stokes photon and the phonon is spontaneous when the Stokes input to the process arises from vacuum fluctuations, and is stimulated when the Stokes signal grows from photons with the correct frequency differential. The spontaneous scattering intensity is proportional to the pump laser intensity, and is determined by a constant factor dependent on the material and the configuration of the pump laser and the detector. The efficiency of this process produces Stokes/Anti-Stokes beams that are typically at levels that are 6–10 orders of magnitude lower than the pump intensity.

To calculate the scattering efficiency, use the second rank tensors $R_{ij}$ that form an irreducible representation of the fourth rank Raman tensor, $I_{ijkl}$. The tensor is contracted with the unit vectors of the pump and Stokes polarizations, $\hat{e}^j_p$ and $\hat{e}^i_s$. Finally, sum over the possible pump and Stokes polarizations (irrelevant for a single polarization pump and Raman laser), and square. Square each Raman tensor contribution and add them for the total scattering efficiency. The formula for this process is shown below, and within this formula, there is an extra factor, A, which includes the spontaneous scattering cross-section measured for a material, and is dependent on the potential to change the polarizability of a molecular vibration:

$$S = A\left[\sum_{i,j=x,y,z} \hat{e}^i_s \cdot R_{ij} \cdot \hat{e}^j_p\right]^2$$

This is the simplest form of the scattering efficiency calculation, valid for isotropic infrared (IR) inactive materials like silicon and barium nitrate. The phonon polarization does not have to be included in the equation because the phonon polarization is triply degenerate, and the phonon polarization's vector can be assumed to be unity in all directions. For material such as gallium phosphide, the equation becomes:

$$S = A\left[\sum_{i,j,k=x,y,z} \hat{e}^i_s \cdot R^k_{ij} \cdot \xi^k \cdot \hat{e}^j_p\right]^2$$

where the phonon polarization unit vector $\xi$ is included in the equation. As before, for a particular pump and Stokes polarization, no sum is required. However, now each of the $R_{ij}$ matrices are associated with a particular crystal axis (x, y, z in the cubic gallium phosphide crystal), and the non-zero scattering components resulting from each tensor without summing and squaring can be normalized to give the phonon polarization vector. This determines the fraction of LO and TO phonons, given both the phonon polarization vector and the phonon wave vector orientations, and therefore the scattering efficiency for a particular phonon. The phonon wave vector direction and magnitude is determined by momentum conservation requirements, where the Raman light wave vector plus the phonon wave vector must equal the pump wave vector.

Each material, depending upon its crystal type, has a set of matrices representing the Raman tensor. These can be found in tables in various publications, and used in the above formulae. Thus each material has specific orientations for optimum scattering, given the pump and Raman light propagation directions, and some materials have orientations that experience no scattering. Thus the spontaneous scattering intensity for a noncollinear pumping geometry must be calculated first to ensure stimulated Raman laser or amplifier operation is possible.

The stimulated Raman interaction process has gain, and therefore significant frequency conversion, so Raman lasers and amplifiers can be developed. "Gain" refers to the process where light enters a material and leaves with more intensity than when it entered. In the regime of small signal stimulated Raman scattering, the Stokes light intensity grows in the presence of the pump laser as $$I_L = I_o e^{(gI_p L)}$$

where $I_p$ is the pump laser intensity, L is the interaction length, $I_o$ and $I_L$ are the incident and amplified Stokes intensities, and g is the Raman gain coefficient, determined by the material, the pump and Stokes polarizations, and in some materials the wave vector directions. If there is sufficient stimulated Raman gain so that the gain equals the loss with every round trip in a Raman laser resonator, the Raman laser is said to have reached "threshold", the condition necessary for measurable stimulated Raman light output. This term threshold can also be applied to a Raman amplifier, where the gain equals the loss once the initial Raman wavelength light source has finished passing through the pumped Raman material one or more times. When the Stokes intensity is within an order of magnitude of the pump intensity, the Raman conversion is described by a more complex equation that can be derived using a Frantz Nodvik amplifier equation approach based on the coupled differential equations:

$$\frac{dI_p}{dz} = -gI_s I_p$$

$$\frac{dI_s}{dz} = +gI_s I_p$$

where $I_s$ and $I_p$ are the pump and Stokes light at position z along the Raman gain length, and g is the stimulated gain coefficient. Stimulated gain coefficients are derived from material properties and the spontaneous scattering efficiency and linewidth:

$$g = \frac{\lambda_p \lambda_s^2 N}{\hbar c \pi n_s^2 \Delta\Omega_R} \left[\frac{d\sigma}{d\Omega}\right]$$

Where g is the stimulated gain coefficient, N is the number of scattering centers, $\lambda_{s,p}$ are the Stokes and pump wavelengths, $n_s$ the refractive index at $\lambda_s$, $\Delta\Omega_R$ is the Raman scattering linewidth and $d\sigma/d\Omega$ is the spontaneous scattering efficiency, given as a cross section per solid angle per unit length.

Once the spontaneous scattering efficiency and therefore stimulated gain coefficient for a particular material has been determined, a Raman laser can be constructed. If the Raman tensor for the material in question is known, the stimulated gain in pump and Stokes directions other than those known for the collinear configurations can be inferred, and a noncollinear Raman laser can be constructed. In a material such as barium nitrate, the stimulated Raman gain coefficient remains the same in all directions as long as the pump laser linewidth is narrow compared to the Raman scattering linewidth, which is 0.4 cm$^{-1}$, and the pump and Stokes light polarizations remain parallel. Other materials have different requirements; polarizations may need to be orthogonal for best efficiency. These isotropic conditions are the only considerations necessary for fluid Raman gain media; however, solid state materials need further Raman tensor analysis if they contain infrared active phonon modes or if they are non-isotropic, as such materials possess phonon modes that can change in frequency and scattering efficiency with crystal orientation.

A Raman laser passes a fraction of Stokes/Anti-Stokes light through the gain media multiple times, prolonging the interaction and therefore improving the conversion efficiency (this multiple passing is done with aligned mirrors, and is known as a resonator). Other advantages to resonators include that both forward and backward Raman scattering is included in the output, and with retroreflection, they can each contribute to the other's gain. Prior art solid state Raman lasers collinearly pump a Raman gain media. Noncollinear pumping provides flexibility in Raman laser configurations and pump laser requirements that can extend the performance of solid state Raman lasers.

In general, stimulated forward and backward Raman scattering do not occur with the same efficiency. In fact, the Raman laser will scatter with the same efficiency in both directions only when pumped by a laser possessing both low beam divergence and narrower spectral linewidth than that of the Raman scattering linewidth. Optimal noncollinear scattering involves similar pump laser requirements to the case of backwards scattering: without carefully matching the pump and Raman linewidths, the stimulated gain may be reduced.

If a multiple spatial mode and multiple longitudinal mode pump laser beam has spatial and temporal intensity variations, the Raman scattered light suffers local variations in gain depending on the path through the pump beam. An effective gain value dependent on the average intensity must be derived. In contrast, a single spatial mode pump beam has a single peak intensity that travels the length of the gain material, creating a region within the single mode spatial profile that causes considerably more gain than that of the random intensity multimode beam of the same pulse energy and gain length. Therefore the Raman beam spatial profile can be very sensitive to the pump beam spatial profile in certain pumping conditions, particularly if the pump and Raman beams travel along together as in the conventional collinear laser geometry. In a high-gain case the pump beam could be completely depleted from the central bright region of the spatial profile before the less intense regions reach threshold, which would limit Raman conversion efficiency. However, if a noncollinear pumping geometry is adopted for either a single or multi spatial mode pump laser, the Raman beam will quickly sample the pump beam's intensity variations along one dimension as the pump and Raman beams cross. Furthermore, if the pump and Raman laser beams cross multiple times, the intensity profile averaging occurs temporally too, allowing much quicker and more effective pump intensity averaging than the collinear configuration can offer.

The implications for pumping at 90 degrees are the same as those in moderately pumped backward scattering cases. If the pump beam is passed multiple times through the gain material, care must be taken to ensure that the pump laser linewidth remains narrower than the Stokes laser linewidth, as the noncollinear gain coefficient will be decreased by a factor proportional to the inverse pump laser linewidth. Both noncollinear direction gain coefficients are therefore the same value, dependent on pump linewidth and crystal symmetry constraints.

This sort of spatial asymmetry in stimulated pumping conditions underlies the fact that it is not obvious that symmetric scattering in the spontaneous regime would translate directly into symmetric scattering in the stimulated regime. Care must be taken with the choice of pump laser linewidth, spatial mode, pump and Stokes light polarization, and in some cases gain material orientation to ensure the same predicted stimulated gain is reached as in the collinear case.

One benefit of the Raman scattering process is that in certain regimes multi-transverse mode pump laser beams can amplify Stokes input signals or Stokes resonator eigenmodes without degradation of the initial Stokes beam quality. This technique is typically referred to as Raman beam clean-up and can also be aided by higher order four-wave mixing processes. The degree of beam clean-up that occurs is a function of multiple parameters, including pump mode quality, the number of pump beam passes and Raman gain. With very high pump beam quality there is a sufficiently long path of high average Raman gain for a single spatial mode of the Stokes beam to dominate the gain extraction, resulting in a single spatial mode Raman beam. If the pump beam is of very poor quality and the Raman gain is modest, then over the Raman gain path the pump intensity changes so much that pump intensity averaging occurs in the evolution of the Stokes beam. Beam clean-up does not occur in an intermediate regime for the collinearly pumped case, where the pump beam is of intermediate quality, and the Raman gain is high. Here the Stokes beam experiences variations of Raman gain across the transverse profile, and replicates the pump beam quality (called "print-through"). This pump beam profile print-through can be more easily avoided in the noncollinear pumping regime, where the geometry inherently produces pump laser beam averaging.

The best performing stimulated Raman scattering solids tend to have a well-defined crystal structure, such as an ionic lattice with coordination clusters that vibrate, for example barium nitrate, potassium gadolinium tungstate or calcium tungstate, or a covalent lattice where the entire lattice vibrates starting at certain positions, for example diamond, silicon carbide or gallium phosphide.

Figure 2:
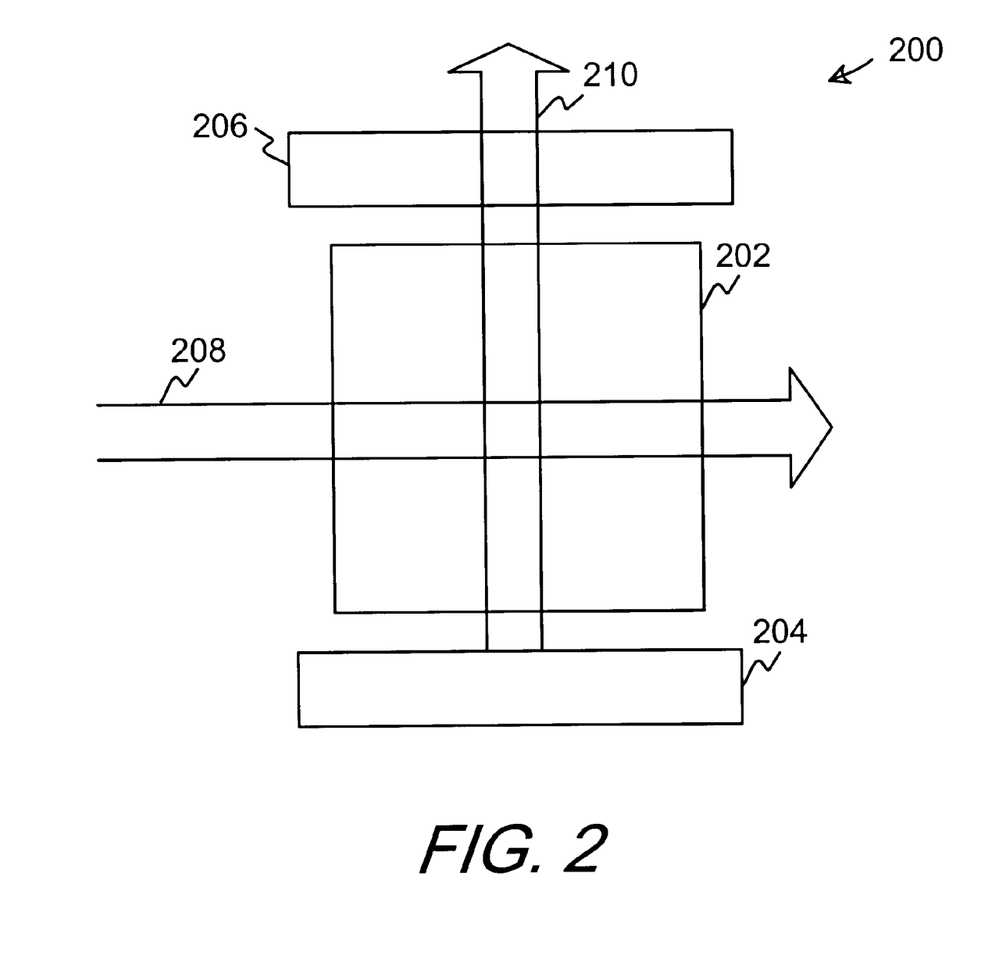
FIG. 2 shows a block diagram of a noncollinearly pumped Raman laser of the present invention.

FIG. 2 shows a diagram of a noncollinear Raman laser beam arrangement of the present invention. Referring to FIG. 2, a solid-state Raman laser 200 has Raman material 202, which may be of any of the types described above, or other types of material. A pump laser 208 passes through the Raman material 202 causing Raman scattering that produces a Stokes or Raman beam 210. The Stokes beam 210 can be contained within a cavity formed by mirrors 204 and 206 to further improve the beam.

Figure 2A:
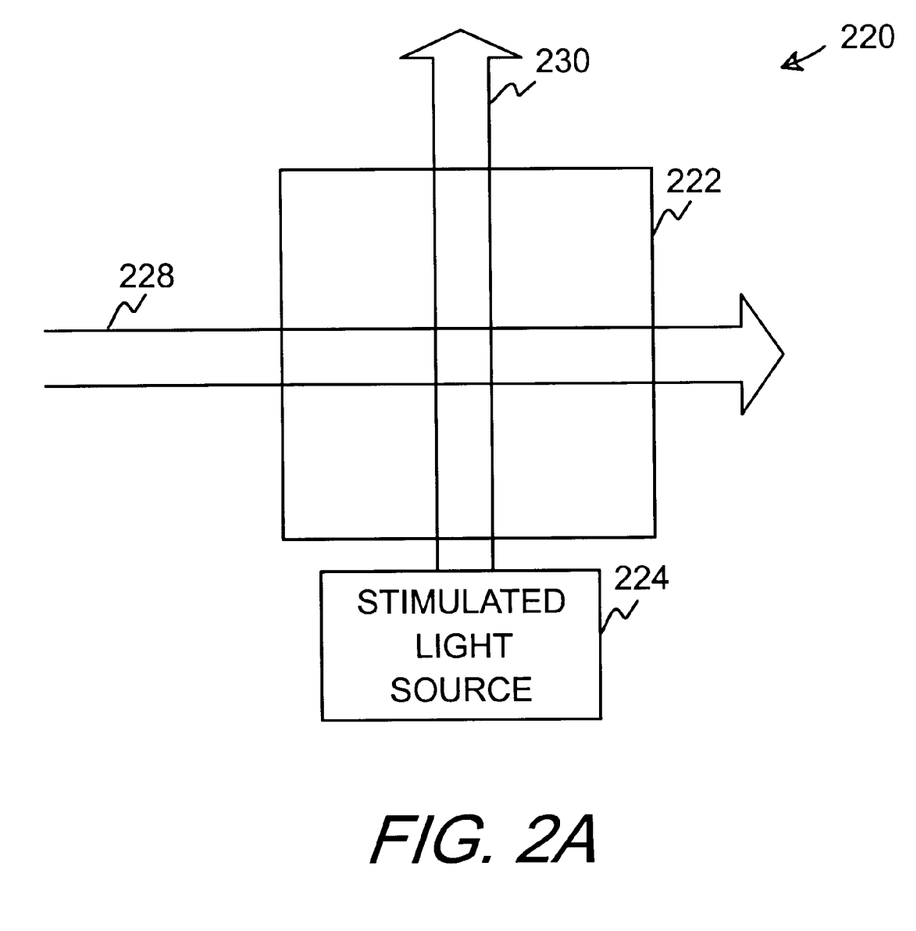
FIG. 2A shows a block diagram of a noncollinearly pumped Raman amplifier of the present invention.

A useful alternative to a Raman laser is a stimulated Raman amplifier. In this case the two mirrors forming the Raman optical cavity in FIG. 2 (204 and 206) can be replaced by a light source at the Raman wavelength of the noncollinearly or collinearly pumped Raman material. FIG. 2A shows a diagram of a stimulated Raman amplifier of the present invention. Referring to FIG. 2A, a solid-state Raman amplifier 220 has Raman material 222, which may be of any of the types described above, or other types of material. A pump laser 228 passes through the Raman material 222 causing Raman scattering that amplifies a beam 230, created by a stimulated light source 224, such as a laser diode. The beam 230 from the light source 224 must be of the same wavelength as a Stokes beam that would be created in the Raman material 222 by the pump beam 228. Light source 224 can be a continuous wave or pulsed source, and should be the same or narrower spectral width than the Raman linewidth. One can also "injection seed" a noncollinearly pumped solid state Raman laser, whereby the Raman laser of FIG. 2 has a narrow spectral linewidth light source or "seed" at the Raman wavelength injected or sent into the Raman laser resonator. The Raman laser output then assumes the spectral characteristics of the light source seed, producing a narrower spectral linewidth output than would be produced without the seed light, provided that the seed laser has enough intensity, has a narrower linewidth than the Raman linewidth, and that its divergence is less than the pump beam divergence.

Figure 3:
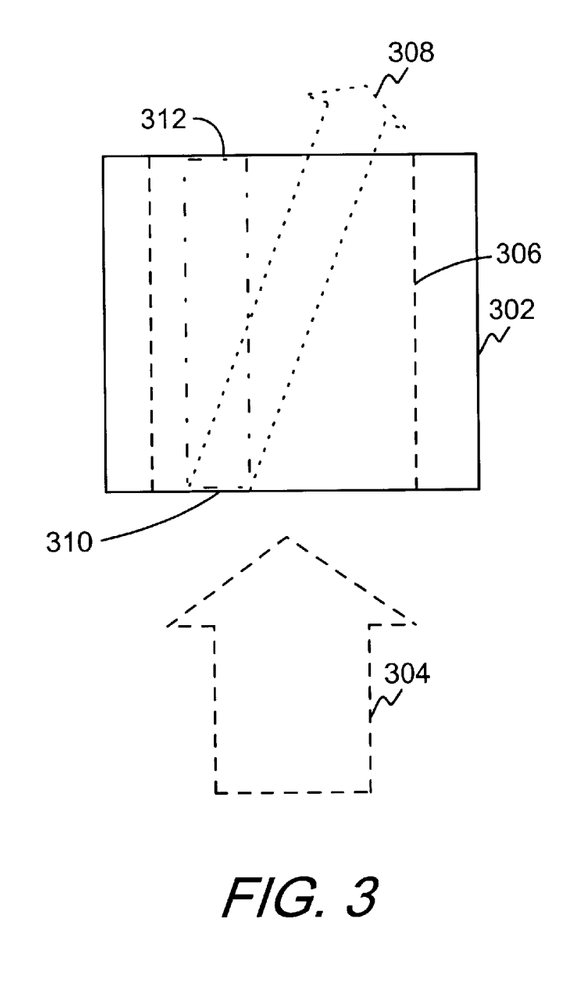
FIGS. 3 and 3A show a diagram of a pump beam and a Raman laser beam within the Raman media and illustrates noncollinearity within the present invention.
Figure 3A:
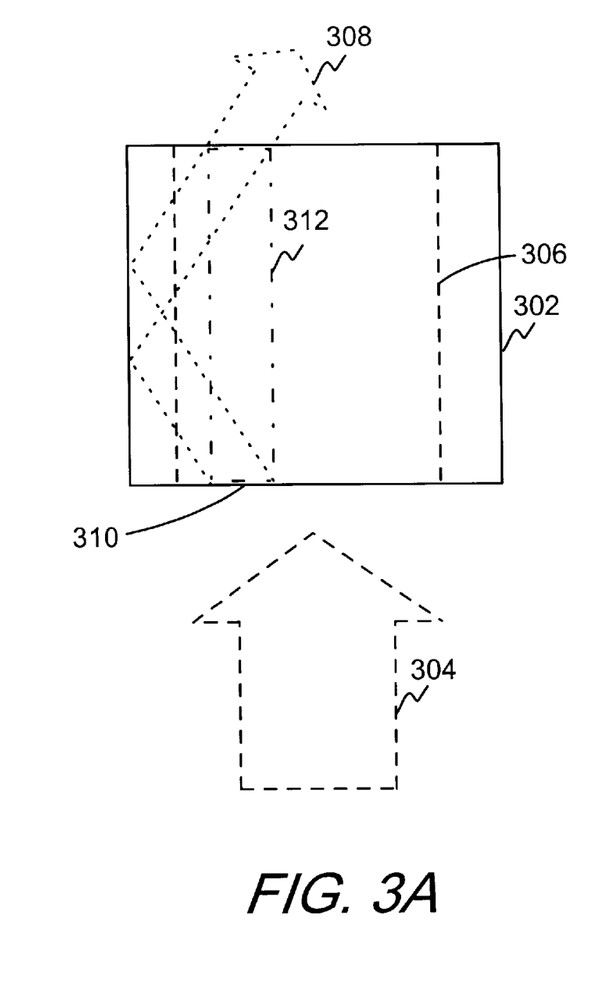

FIG. 3 and FIG. 3a illustrate the requirements of "noncollinearity" for when the stimulated Raman light does not completely fill the Raman material. Referring to FIG. 3, Raman material 302 (solid lines) has a pump beam 304 (dashed lines) passing therethrough, creating pumped Raman material volume 306 (dashed lines). The Raman or Stokes laser beam 308 (dotted lines) as it enters the pumped Raman material volume 306 defines an entrance spot area 310 (dot-dashed line). A virtual laser beam 312 (dot-dashed lines) can be created with the same spot size and beam divergence as the Raman laser beam 308, starting from entrance spot 310, except that the virtual laser beam 312 is aligned collinearly with the pump laser beam. If the Raman beam 308 separates spatially from the virtual laser beam 312 at some location within the pumped Raman material 306, the device is noncollinear.

There is another, more obvious set of cases where the pump and Raman beams are noncollinear, not illustrated by FIG. 3 and FIG. 3a. If the Raman beam completely fills the Raman material, it is possible that the virtual laser beam cannot separate spatially from the Raman beam. However, the pump and Raman beams are still noncollinear if, within the Raman gain material, the Raman beam travels completely across the pump beam. This definition is shown in FIG. 2 and FIG. 2a for an unfilled material case. Furthermore, the beams are noncollinear if, after the Raman beam has passed multiple times and places through the Raman material, the Raman beam completely crosses the pump beam that is inside the material.

An advantage of choosing this definition of noncollinearity is that cleanup of the pump beam occurs when the Stokes beam does not encounter the same part of the pump beam in a single pass through the pumped Raman gain material. With this type of noncollinearity, pump beam intensity variations are smeared out, and the overall Stokes gain is more even, producing a smoother, better beam quality Raman output than the pump input.

The noncollinear pumped Raman laser consists of the same Raman laser components as in the collinear case, but the Raman gain material allows access through the sides for the pump laser. A pump laser does not share the same optical axis as the Stokes laser, instead crossing the Stokes laser axis at an angle sufficient to prevent overlap as described above. The pump laser typically enters the Raman material at right angles to the Raman laser axis, and there are no locations in the material where the pump and Raman laser axes coincide. In order to create enough gain length along the Raman laser optical axis, the pump laser may be folded and passed repeatedly through the Raman material, all at the same angle of 90 degrees or very nearly 90 degrees to the Raman laser optical axis. Of course, other angles are possible between the pump and Raman beams, as long as the condition for noncollinearity described in FIG. 3 is met.

There have been prior art published results of transversely pumped gaseous Raman lasers that show no reduction in gain and demonstrate particular polarization state outputs.

Fluids with randomly oriented molecules that vibrate or rotate to produce the phonon have no overall laboratory direction. A laser sent in at any angle encounters the same material orientation, which implies it has an equal chance of exciting the particular phonon of interest. This is not the case in a single crystalline solid. In a single crystalline solid the phonon may still be produced by vibration, but the laser sent into materials with different crystal orientations will encounter different lattice orientations, and therefore can experience different capabilities of phonon excitation and gain.

In selecting solid state materials for noncollinear pumped solid state Raman lasers, the type of vibration mode in the Raman scattering plays a large role. If the material produces Stokes light with a polarization that is orthogonal to the pump light polarization, there is a further restriction in the directions that the pump and Stokes wave vectors can assume. Ideally, the scattering efficiency must be determined to ensure that the maximum possible scattering efficiency is appealed to in a particular laser configuration given a crystal orientation. In the cubic material barium nitrate, the maximum coupling occurs when the pump and Stokes polarizations are aligned. The cubic nature of barium nitrate allows any direction to excite the same Raman vibration with equal efficiency, assuming the pump and Stokes light polarizations remain parallel. All pump and Stokes propagation directions will excite the same simple phonon vibration, and the phonon energy is unchanged with crystal orientation. The spontaneous Raman scattering intensities and polarizations for barium nitrate at multiple crystal orientations and detection geometries were measured, and the scattering intensities were unchanged with crystal orientation and with detection direction (90° or 180°), and scattered light polarization was confirmed to be the same orientation as the pump polarization. A low beam divergence pump-probe experiment further verified that the Raman frequency shift, linewidth and Raman gain coefficient were identical for forward and backward stimulated Raman scattering. These measurements show that as long as the polarization vectors of the pump and the Stokes field are parallel, stimulated Raman gain is possible in barium nitrate for any propagation directions of the pump and Stokes light.

Noncollinear Raman laser pumping provides for the possibility of a new class of Raman laser. A Raman laser must meet an energy conservation requirement similar to that of an optical parametric oscillator (OPO) in that the generated phonon and Stokes photon energies sum to the pump photon energy. Similarly, the Raman laser must meet a momentum conservation requirement where the phonon and Stokes photon momenta add up to the pump photon momentum. However, in a barium nitrate solid state Raman laser, satisfying momentum conservation no longer requires a collinear or nearly-collinear geometry. Because the third momentum vector belongs to a phonon that can have much larger momentum than either photon, the pump and Stokes photons can assume orthogonal propagation directions without violating momentum conservation. This is because the phonon changes relatively little in energy when momentum is changed (this is also described as a phonon having low "dispersion"), compared to a photon, so phonon energies similar to pump or Stokes photon energies can correspond to a wide range of momenta. Moreover, the barium nitrate Raman shifting phonon is dispersionless with direction in the crystal, and any pump-Stokes wave vector geometry at any crystal orientation can be implemented without change to the scattered photon energy. To create a noncollinearly pumped solid state Raman laser, first determine that the scattering efficiency for the pump and Raman light polarization orientations chosen will be sufficient to reach stimulated threshold in a particular noncollinearly pumped geometry. Choose a phonon mode that is Raman active and infra-red inactive, that is, an optical phonon that does not change in frequency as the angle between the pump and Raman laser beams is changed. Given a pump laser, design for a sufficient stimulated Raman gain to reach threshold, based upon the known collinear stimulated gain coefficient scaled to a noncollinear stimulated gain coefficient using the scattering tensor calculations shown above. Note that the pump laser no longer sustains a peak intensity along the gain length in the middle of the pump spot; the Raman gain length experiences a one dimensional (1D) average in pump intensity by physically passing through the pump beam. Once a gain length for the noncollinear geometry has been determined, the resonator can be formed which allows for a nominally elliptical gain region within the crystal. As the pump passes through the side, the gain region is elliptical and bounded by the Raman gain material dimensions. A 1D unstable resonator with an elliptical beam shape can be used; alternatively, a folded Raman resonator that has a spherical mode profile that is multiply passed through the noncollinear pump beam can also be used. The advantage of noncollinear pumping is that despite significant pump depletion the pump laser continues to sweep through the Raman mode and experience continued depletion; there are no converted "holes" in the pump beam preventing further pump conversion. A noncollinear Raman amplifier can also be constructed using very similar methods, where the Raman resonator is replaced by a light source at the Raman wavelength. With sufficient stimulated Raman gain, the calculation of which is described above, significant amplification of the input light source can be achieved. The sides of the Raman material should be polished, and preferably antireflection coated at the pump and $1^{st}$ Stokes wavelengths if the pump beam is to be passed through the crystal multiple times. If pump folding mirrors are used, they preferably have little to no reflectivity at the $1^{st}$ Stokes wavelengths, in order to prevent collinear Raman lasing along the pump beam path in a high-Raman-gain system. The main resonator mirrors for the noncollinear pumped solid state Raman laser need to have appropriate reflectivities at both $1^{st}$ and cascaded Stokes wavelengths, in order to promote the single Stokes wavelength required for the interaction. As an example, if $1^{st}$ Stokes light only is required, then the following mirrors would be suitable: at the $1^{st}$ Stokes wavelength, one mirror is highly reflective and the other is partially reflective (~50%), and at the $2^{nd}$ Stokes wavelength, both mirrors have low reflectivities (<~20%) to prevent any $2^{nd}$ Stokes scattered light reaching sufficient intensities for lasing. A Raman gain material, such as barium nitrate, is preferred because of its efficient non-dispersive 1047 $cm^{-1}$ shift Raman vibration mode, its high optical damage threshold and low linear absorption. A Q-Switched Nd:YAG laser with 60 ns long pulses, 150–200 mJ pulse energies, is suitable for pumping a 5 cm long barium nitrate crystal with six passes of the pump beam focused to elliptical beams of height 1 mm full width (=two times $e^{-2}$ waist) and of width 4–6 mm full width. Note hat in general other pump laser output formats could be used: the pump laser could be mode locked, pulsed by another means such as gain-switched, or even continuous wave. The barium nitrate can have normal incidence end faces with antireflection coatings at the $1^{st}$ Stokes wavelengths. This example contains all laser beams within one plane and simplifies pump preparation and Raman resonator optics. The resonator optics are highly reflective at the Stokes wavelength except for a partially reflective output coupler. Typically the device uses an output coupler with a reflectivity of 50% or less, to coincide with the high gains often found in Raman lasers. This is one example, but there are other possible pump laser and Raman laser characteristics that would be possible, and apparent to any one skilled in the art.

Raman lasers of the present invention can actively improve (via Raman conversion) the wavefront quality and, therefore, propagation performance of an output beam. This process is termed beam cleanup. Beam clean-up happens when the Stokes field seed light encounters a Raman gain or pump intensity spatial profile that is smooth on average. A multi-transverse mode pump laser typically has many intensity hotspots that the small signal Raman gain magnifies as the exponential of the pump intensity. In the collinear geometry, any persistent large-scale intensity structure of a collimated pump beam will pattern through onto the Raman gain profile causing a degradation in the beam quality of the Stokes output. Some intensity averaging is possible by focusing the pump beam so that the Stokes beam does not propagate along with the pump structures. The preferred embodiment of the present invention has a greater amount of intensity averaging as the pump beam travels noncollinearly to the Stokes field. In the near-monolithic noncollinearly pumped solid state Raman laser, shown in FIG. 6 and discussed below, there is additional averaging as the pump beam intensity profile is both highly averaged by mode mixing and completely contained in the lightguide. There is also an additional degree of freedom in the noncollinearly pumped architecture that does not exist in the collinear case. In the noncollinearly pumped architecture, the spot sizes and intensities of the pump and Stokes beams can be adjusted independently, which allows optimization of both the gain lengths and the overlap.

In collinear pumping there is no independent control of where along the Raman optical axis the Raman laser performs most of the conversion, and thus deposits the most phonon-originated heat. This can cause uneven heat loads within a Raman gain material, exacerbating thermal loading problems. With noncollinear pumping, the gain length can be increased without risk of single-area conversion, or a single hot spot, within the gain material by folding the pump beam. This causes the heat deposition to occur at multiple locations, which divides the total heat load into evenly spaced regions throughout the gain material. In the preferred embodiment, the pump laser beam passes so that it illuminates 90% of the length of the material, minimizing thermal stress loads. Moreover, the pump laser can be arranged to not impinge at the Raman material end faces, where the most severe thermal problems can occur. In the preferred embodiment, this should be a distance of at least 5% of the length of the Raman material away from the ends of the Raman material. This provides the equivalent of "end caps" in a Raman laser, a technique used in lasers to contain the most intense stress within the body of the solid state gain material, lessening the chance of stress fracture. Therefore, noncollinear pumping provides more flexibility in the construction of a thermal heat load profile, allowing further power scaling of a Raman conversion device without catastrophic fracture or other adverse thermal effects.

The noncollinear geometry provides inherent compactness of the overall pump and Raman laser device. With the efficient beam cleanup offered by the beam averaging noncollinear geometry, the pump laser no longer has to be of reasonable beam quality, or even high brightness over the length of the Raman gain. In fact, the pump laser required propagation distance through the Raman laser gain material can be reduced to the narrowest cross-dimension of the Raman material, if passed singly through the Raman material, rather than the longer Raman optical axis through the material. The result is a laser no larger than a typical multimode pump laser, but it produces improved beam quality at a shifted wavelength.

Noncollinear pumping has greater flexibility in the way the pump laser beam is coupled to the solid state Raman laser, with several configurations equally viable, dependent on the optimal Raman gain for the laser design. In one embodiment, the pump laser passes through the gain material once at right angles. The pump laser can be reflected with a mirror to pass back again, doubling the intensity and therefore the Raman gain, while maintaining the same Raman gain length. Alternatively, the pump beam can be folded back and forth multiple times through the Raman gain material, creating a longer Raman gain length. Several optical devices can be used to create a pump beam path that does not simply reverse upon itself, which would increase the pump intensity and chance for material optical damage, without increasing the pump gain length. One alternative embodiment uses a row of prisms that turn the pump beam round and back into the crystal.

One embodiment for multiple pump beam passes being achieved with minimal optics is a crossbow configuration. Here, four mirrors are used, or alternatively two prisms, and the pump beam is sent into the Raman material once and automatically remains in the plane of incidence with an adjustable beam pass position separation dependent on the pump laser spatial profile and length of Raman material along the Raman optical axis.

Figure 4:
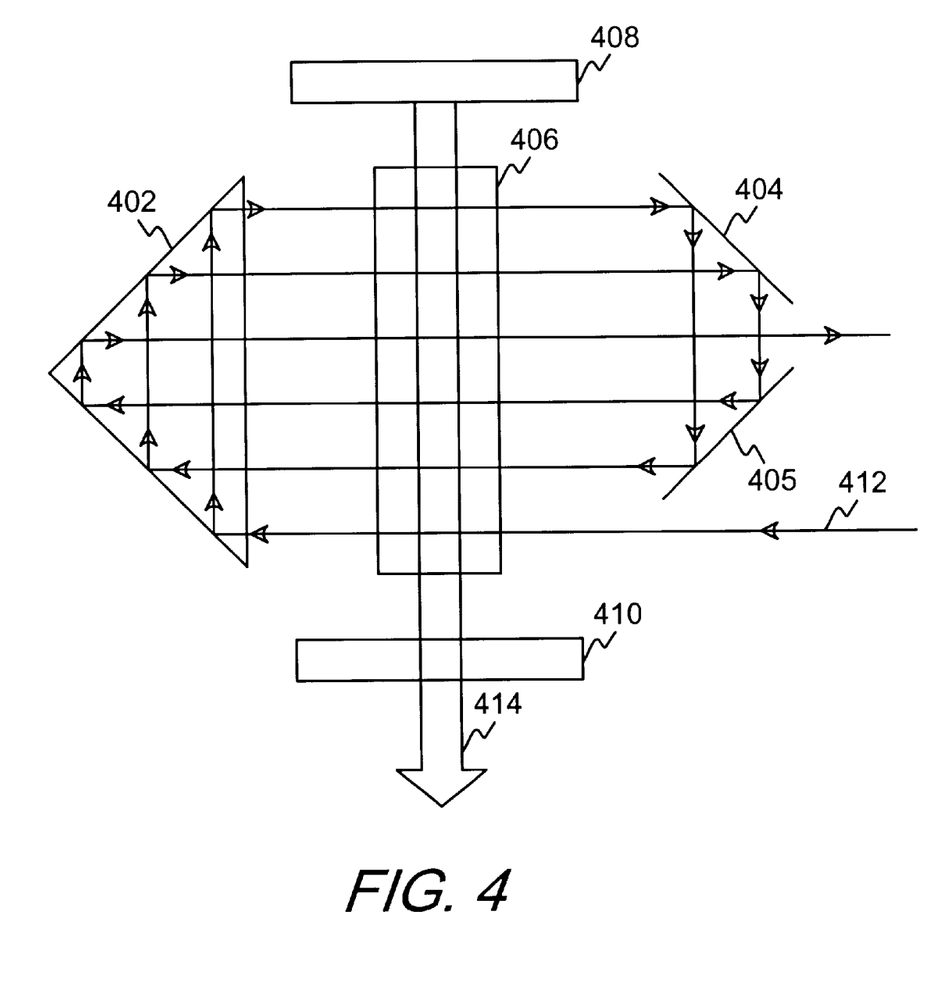
FIG. 4 shows a diagram of a Raman laser that uses a pump pulse length compression process.

FIG. 4 shows the "crossbow" configuration. Referring to FIG. 4, a prism 402 faces two mirrors 404 and 405. Raman gain material 406 is inserted between the prism 402 and the mirrors 404 and 405. In the preferred embodiment, the Raman gain material 406 is antireflection coated at zero degrees incidence. The centers of the prism and mirrors are offset by the center-to-center pump beam separation desired. Line 412 traces the path of the pump beam as it traces out a folded beam path, starting by passing the edge of mirror 405 and entering the prism 402, and finishing by exiting between the mirrors 404 and 405 avoiding pump laser feedback. Alternatively, mirrors 404 and 405 could be replaced by a prism, wherein the pump beam finishes by impacting the center of the prism. For a high gain solid state Raman laser (SSRL), the prism 402 is replaced by mirrors that are antireflection coated at the first Stokes wavelength, so that a Raman amplifier cannot be initiated along the pump beam path. Such a Raman amplifier would compete with the noncollinearly pumped SSRL.

The device of FIG. 4 can also be used as a pulse compressor. In this embodiment a folded delay line comprising elements 402, 404, 405 and 412, is configured for multiple passes of the pump pulse through the SSRL crystal at right angles to the SSRL cavity axis. The maximum temporal distance from any part of the pump laser beam to the Stokes beam in the crystal is equal to the single fold delay time. The Stokes gain in the noncollinearly pumped SSRL is determined by selecting the pump spot size and number of pump beam passes through the crystal. The gain is set such that the SSRL does not reach threshold until the pump pulse has propagated through the folds and filled the delay line. A highly outcoupled, efficient Raman cavity with a roundtrip time small compared to the delay time will then convert all of the pump light within one fold delay time. Thus the propagation time for one fold corresponds to the SSRL pulse duration. By using a high gain system with significant output coupling, the pulse is able to leave the cavity in essentially one SSRL round trip. Thus the pump beam folding allows the entire pump beam to pass through the SSRL crystal within a fraction of the pump pulse length, wherein a fraction is 20% in the preferred embodiment, and the high gain, highly outcoupled SSRL cavity is able to produce a short pulse during this time.

Figure 5:
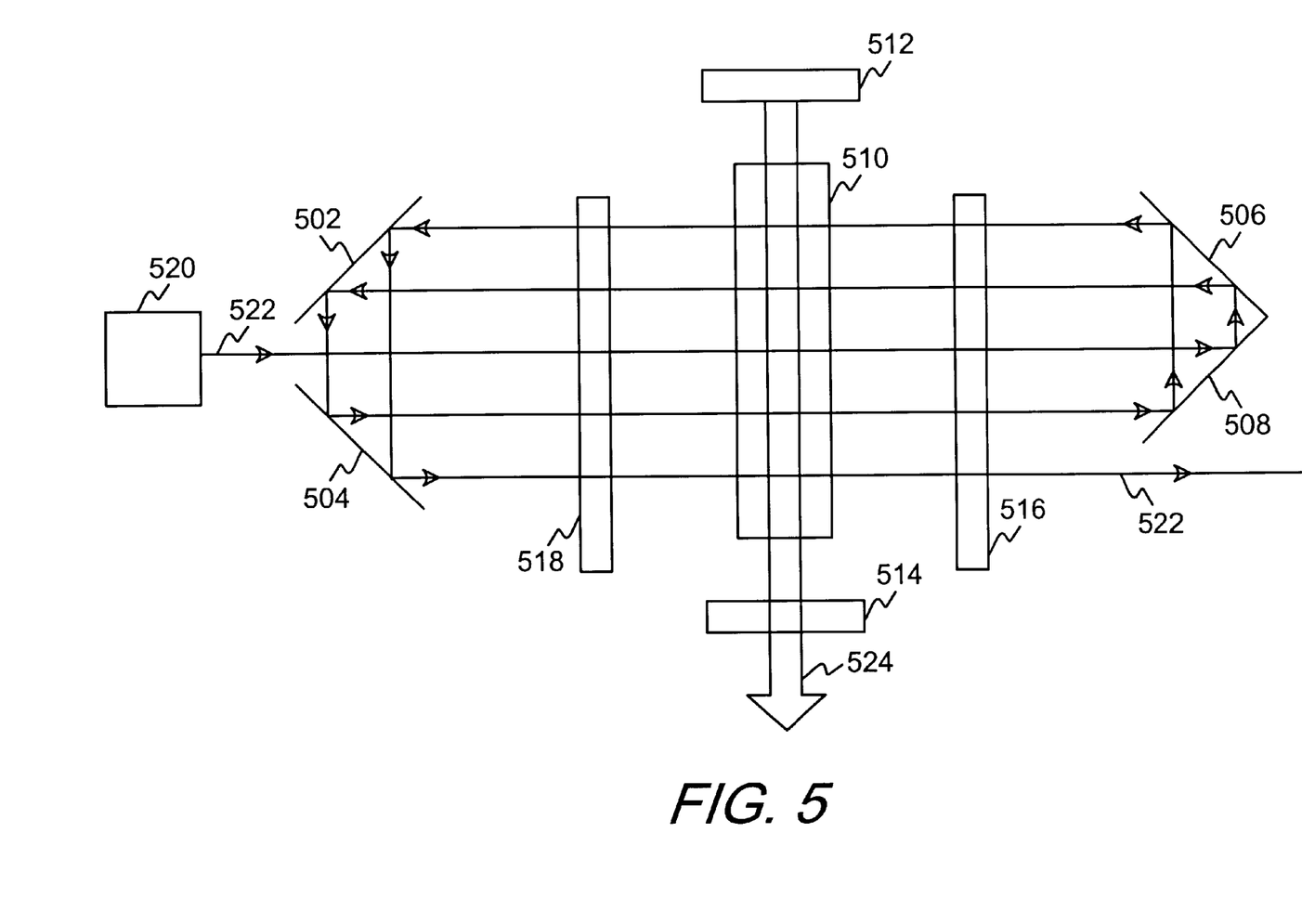
FIG. 5 shows a diagram of a Raman laser that uses lenses to image relay the pump beam through the folded delay line.

FIG. 5 shows one preferred embodiment. In this embodiment, the pump laser 520 comprises a Q-Switched Nd:YAG laser with an intracavity etalon to narrow the output to the Raman spontaneous scattering linewidth. The pulse width of this laser was 60 ns FWHM. 2 ns is the time it takes for each fold in the pump beam to leave and re-enter the Raman crystal. It was not practical to multiply fold a 60 foot long multi transverse mode pump beam 522 through an SSRL crystal in a 2 ns time frame. Therefore all of the pump beam which is contained between mirrors 502, 504, 506 and 508 at any one time passes through the crystal once in 2 ns. However, if only a 10 ns section of pump pulse is contained in the folded delay line with a 2 ns delay, then a series of 2 ns SSRL pulses are produced, separated by the 10 ns filling time. This is the Raman laser equivalent to relaxation oscillations in a laser, where the pump pulse undergoes repeated depletion of the energy in the delay line, and recovery as new pump fills the delay line. The signature of the pulse compression mechanism is an initial pulse plus relaxation oscillations in the temporal output data. Mirrors 512 and 514 along with Raman material 510 make up the Raman laser resonator, which produces an output Raman beam 524. In this embodiment, end mirrors 502, 504, 506 and 508 transmit $1^{st}$ and $2^{nd}$ Stokes light scattered along the pump beam axis. Cylindrical lenses 516 and 518 image relay the pump beam 522 through the delay line.

A further preferred embodiment obviates the need for the pump laser to travel in free space and be focused into the Raman material, by containing the pump light in a light guide made of solid state materials necessary for a pump laser. Several blocks of material, each polished on all sides, are physically connected to each other to form a single lightguide, or a "near-monolithic" laser. Two ends of this composite block are coated to form the end mirrors to create a laser resonator within the several blocks of material. The surfaces of each block of material are polished and, optionally, coated so that pump and Raman light is totally internally reflected from the sides of the blocks of material and thus passes through the end of each block to the next block of material. The blocks of material are in physical contact with each other so that a highly divergent laser beam can pass through from block to block without significant (<3%) loss. Alternatively, the blocks of material can be anti-reflection coated and placed in close proximity (<0.1 mm) to each other so that a highly divergent laser beam can pass through from block to block, again without significant loss. Also, because of the containment-by-reflection nature of the resonator formed by the blocks of material, the blocks of material do not need to be carefully aligned to each other or have precise dimensions in order to create an optimized resonator, thus making the resonator easy to assemble and align. Such material blocks could include, for example, the gain material such as Nd:YAG, an electro-optic Q-switch, and one or more polarizers. The Nd:YAG block of material can be diode-laser-pumped to create the gain element in the laser resonator. Other blocks of material could be added as necessary to the near-monolithic laser resonator for frequency and spectral linewidth control (an etalon) or laser intensity control (a diverging or homogenizing element to spread out laser hot spots). Other elements could be added to optimize laser performance, just as one skilled in the art might do to optimize other lasers, with the added requirement that the element have a clear aperture at the end faces and have polished and, optionally, coated sides for reflection or total internal reflection.

The resultant laser beam from the resonator will not form a standard free-space propagation mode, nor will it always form a boundary-condition-dependent waveguide mode, each of which have well-defined propagation properties. Because the light is able to assume large off-axis angles between the resonator end mirrors without escaping the resonator, it does not require an eigen-solution or mode to complete one round trip without appreciable loss. Therefore a highly complex, random in nature laser output beam will be produced, which will have highly divergent propagation in free space. By using this laser to pump a noncollinear solid state Raman laser, the divergent laser output can be cleaned up to assume much better propagation properties while being converted to another wavelength. This combines the low-loss and easy-to-assemble nature of the pump laser with the beam clean-up and wavelength shift of the Raman laser to form an efficient, compact, easy-to-assemble laser source. To this end, a Raman material such as barium nitrate can be inserted between pump laser end mirrors so that the pump light is physically coupled into the Raman material intracavity, or in the pump laser cavity. End mirrors for a Raman resonator can be added to form a Raman beam optical axis that is noncollinear to the pump beam optical axis.

Figure 6:
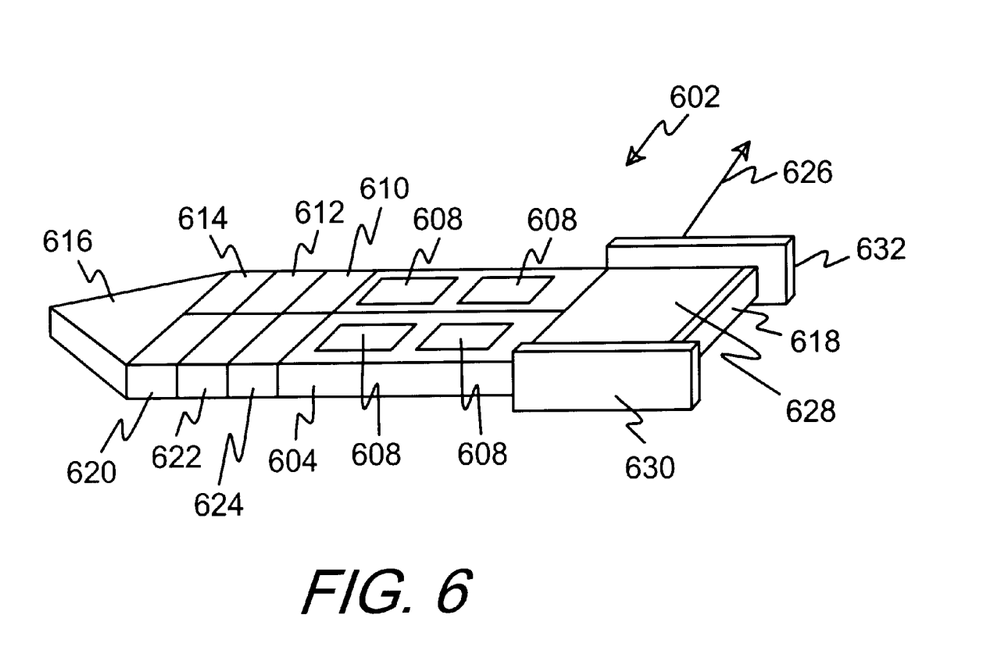
FIG. 6 shows a diagram of a Raman laser that uses a noncollinear near-monolithic pump laser.

FIG. 6 shows this embodiment wherein an external pump laser is replaced by a Q-Switched pump laser, which has the Raman material 628 placed intracavity. Referring to FIG. 6, Quasi Continuous Wave (QCW) pump diode laser arrays 608 emit light that is absorbed by material 604, which is typically Nd:YAG. The diode laser arrays are placed adjacent to the top of the material 604, and emit light directly into the material. Polarizers 610, 614, 620 and 624, and Q-Switches 612 and 622, along with prism 616 provide a single, polarized pump beam to the Raman material 628 to produce a Raman output beam 626 with Raman resonator mirrors 630 and 632. The pump end mirror 618 contains pump light until it is converted into the Raman laser and leaves as beam 626, which increases Raman conversion efficiency. The pump area defined by mirror 618 and prism 616, and the Raman area defined by mirrors 630 and 632, can be separately optimized to provide the best performance.

In the preferred embodiment, example dimensions of the Nd:YAG slab is 4×20×50 millimeters, and the barium nitrate slab is 4×20×7 millimeters. 50 quasi-CW laser diode pump bars at 805 nm wavelength pump the Nd:YAG slab, and a prism forms an Nd:YAG laser cavity that is U shaped, reflecting at the highly reflective (reflectivity>99%) end mirror 618 placed after the barium nitrate crystal, which is highly transmissive at the Stokes wavelength (reflectivity<10%). The Raman resonator is formed with two mirrors separated by less than 1 foot (in order to optimize the number of round trips for a compressed Raman laser pulse), and has outcoupling of 50–70%. Between the prism and Nd:YAG slab are placed four polarizers and two Q-Switches, also physically coupled so that the entire pump resonator is contained in a fixed physical volume.

Each pump laser module 602 is designed in a near-monolithic configuration, where the Nd:YAG laser mode is contained in a totally internally reflected gain volume with arbitrary numbers of bounces. The Nd:YAG laser cavity also contains the Raman gain material which is noncollinearly pumped within the Nd:YAG laser cavity, and the pump laser light can only be outcoupled via Raman conversion at right angles. During conversion the pump laser beam wavefront is averaged and cleaned up to produce a superior spatial beam quality in the Raman laser output. This wavefront averaging can be further assisted by inserting a "mode mixer" into one end of the Nd:YAG laser resonator, such as a random microlens array, which mixes up the Nd:YAG laser wavefront with each pass. This mode mixer is designed to prevent large hot spots from propagating multiple round trips in the Nd:YAG resonator. If such hot spots are not promptly dissipated, they could cause optical damage.

Figure 7:
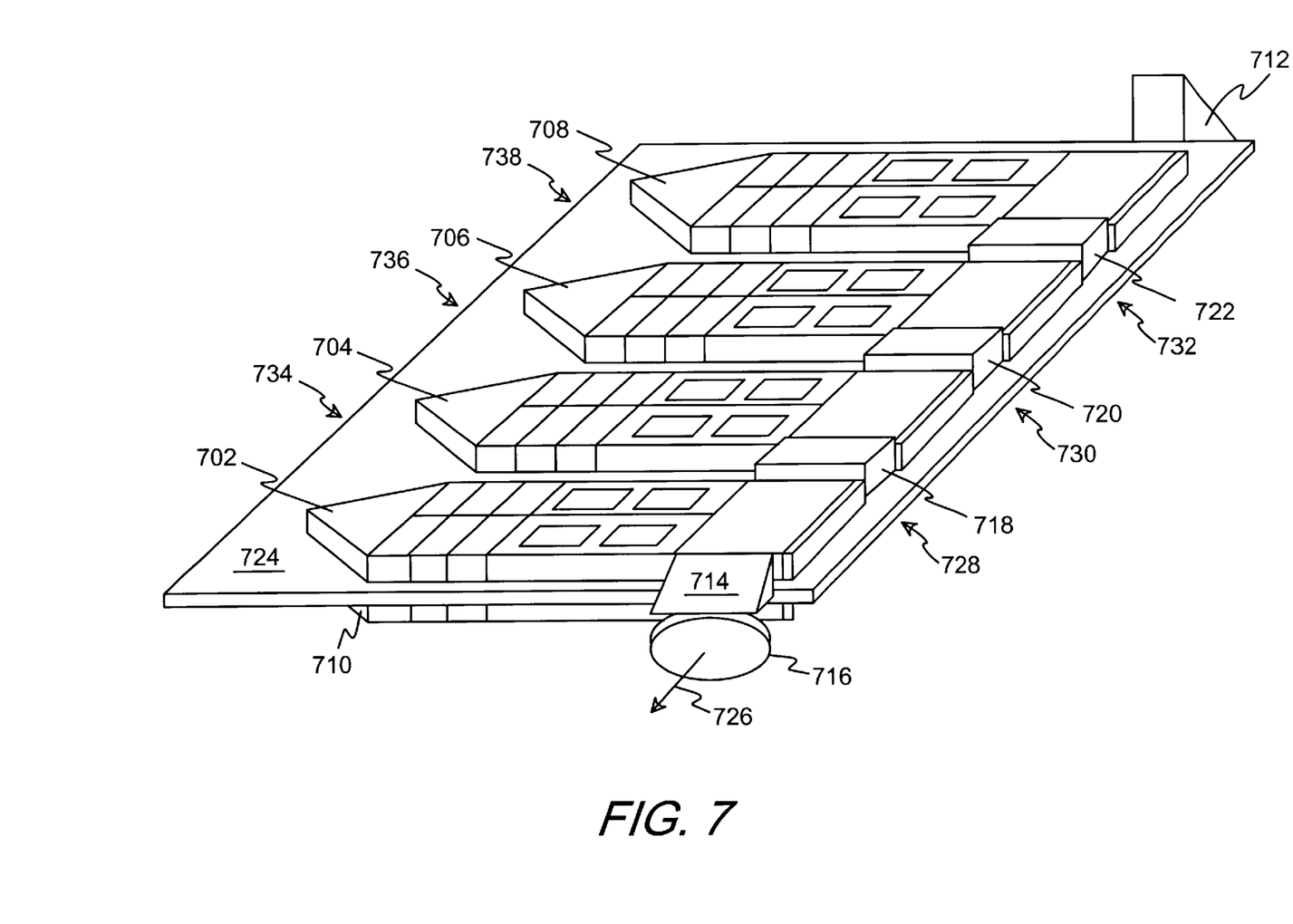
FIG. 7 shows a diagram of a Raman laser that combines multiple near-monolithic pump lasers into a single Raman beam.

With the development of a near-monolithic approach to the pump laser construction, the use of an intracavity noncollinearly pumped SSRL configuration will allow an arbitrary number of pump lasers to be combined into a single Raman laser pulse output. This is shown in FIG. 7, which shows multiple modules 702, 704, 706, 708, 710, 734 (not shown, but located on the underside of the board 724 opposite module 704), 736 (not shown, but located on the underside of the board 724 opposite module 706), and 738 (not shown, but located on the underside of the board 724 opposite module 708), as described above with respect to FIG. 6, to be combined using polarizers 718, 720, 722, 728 (not shown, but located on the underside of the board 724 opposite polarizer 718), 730 (not shown, but located on the underside of the board 724 opposite polarizer 720), and 732 (not shown, but located on the underside of the board 724 opposite polarizer 722), prisms 712 and 714 (712 half shown), and mirror 716 to produce a single output 726. All these components except Raman resonator components 712, 714 and 716 are mounted on a single board 724. The polarizers control the amount of Raman light that passes around the Raman cavity, and therefore controls the Raman gain. These are controlled electrically, or mechanically oriented to achieve the appropriate Raman laser gain. This ensures the same optimal pump depletion behavior whether 1 or 8 pump modules are fired simultaneously.

By timing the pump laser pulses produced by each pump laser shown in FIG. 7 (702, 704, 706, 708, 710, 734, 736, 738) to provide pulses timed to approximately within the length of a single pump pulse, the combined pulse energy pumps a single Raman laser made of multiple Raman crystals 628 (FIG. 6) and produces a single Raman pulse as output 726. As the preferred embodiment device is intracavity pumped, the fast pump laser depletion in a high gain Raman laser cavity will further produce a short pulse length out, on the order of 1–2 ns if the Raman cavity remains short enough for a 1 ns round trip time.

In a noncollinearly pumped Raman laser, the pump laser can be retroreflected back through the Raman gain material, increasing gain. This can also be done with a prism, which by displacing the return pump beam, avoids doubling the pump intensities and still provides more gain. This is because the noncollinear Raman laser beam passes through both pump beams and experiences double the gain length, rather than double the pump intensity—both changes increase the Raman gain by the same amount. The transverse pumping path can be contained within a partially lightguiding material, to contain a diverging spatial multimode laser beam. The pump laser can be incident at the Raman material's Brewster angle or some other non-orthogonal and non-collinear angle, to minimize AR coatings and to maximize scattering efficiency. Spherical or cylindrical lenses can be used to bring the pump to an optimal beam size and intensity, and to re-image a pump beam into a Raman crystal with successive passes.

Pump lasers can be, for example, a flashlamp-pumped or diode-pumped 1.338 micron Nd:YAG laser, with energies varying from 10 to 400 mJ, pulse length 10 to 60 ns, producing intensities of 30 to 1000 $MW/cm^2$. The same pump laser material can also be used at 1064 nm wavelength output, or 1319 nm wavelength. Wavelengths should be chosen to allow both pump and Stokes wavelengths to experience low linear or nonlinear absorption losses in the material. For example, Barium nitrate used for the Raman material must have pump and Raman wavelengths shorter than 1.8 microns. Gallium phosphide used for the Raman material must have pump and Raman wavelengths longer than 900 nm and shorter than the IR cutoff defined by the Restrahlen bands.

Having thus described a presently preferred embodiment of the present invention, it will be understood by those skilled in the art that many changes in construction and geometry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A stimulated Raman gain device comprising:
    a solid state Raman material for producing a stimulated Raman beam, wherein the material has at least one localized phonon Raman active vibration mode wherein the vibration mode does not change in frequency when varying an angle between a pump beam and the Raman beam;
    a pump laser connected to project the pump beam into the solid state Raman material to produce the stimulated Raman beam, wherein an axis of the pump beam is noncollinear to an axis of the stimulated Raman beam when the stimulated Raman beam completely fills the solid state Raman material, the stimulated Raman beam travels completely across the pump beam within the solid state Raman material, and when the stimulated Raman beam does not completely fill the solid state Raman material, the stimulated Raman beam completely separates physically, at some location in the solid state Raman material, from a virtual beam having a same entrance spot size and beam divergence as the stimulated Raman beam, wherein the virtual beam is collinear to the pump beam axis;
    a pump beam reflecting device mounted on a side of the solid state Raman material opposite the pump laser and connected to reflect the pump beam back through the solid state Raman material as a reflected pump beam, wherein the reflected pump beam is substantially parallel to the pump beam and the reflected pump beam is spatially offset from the pump beam; and
    an optical cavity for at least partially containing the stimulated Raman beam.

2. The stimulated Raman gain device of claim 1 wherein the pump beam reflecting device comprises a prism.

3. The stimulated Raman gain device of claim 1 wherein the pump beam reflecting device comprises at least two reflective surfaces.

4. The stimulated Raman gain device of claim 1 further comprising:
    a second pump beam reflecting device mounted on a same side of the solid state Raman material as the pump laser is mounted and connected to reflect the reflected pump beam back through the solid state Raman material as a second reflected pump beam.

5. The stimulated Raman gain device of claim 1 further comprising:

a second pump laser connected to project a second pump beam into the Raman material, wherein the second pump beam is projected on an axis different from an axis through which the pump beam is projected.

6. The stimulated Raman gain device of claim 1 wherein the pump laser is mounted to project the pump beam a predetermined distance from an end of the solid state Raman material.

7. The stimulated Raman gain device of claim 1 wherein the pump laser is mounted to project the pump beam through a most narrow dimension of the solid state Raman material.

8. The stimulated Raman gain device of claim 1 wherein the pump laser is contained within a light guide, and wherein the light guide further contains the solid state Raman material.

9. The stimulated Raman gain device of claim 1 further comprising:
 a polarizing device mounted within the optical cavity.

10. The stimulated Raman gain device of claim 4 wherein the second pump beam reflecting device is aligned to reflect the second reflected pump beam substantially parallel to the reflected pump beam.

11. The stimulated Raman gain device of claim 5 wherein the second pump laser is mounted to project the second pump beam a predetermined distance from the pump beam.

12. The stimulated Raman gain device of claim 5 wherein the pump laser and the second pump laser are Q-switched.

13. A method for stimulated emission of Raman radiation, said method comprising the steps of:
 (a) mounting a pump laser on a first side of a block of solid state Raman material, wherein the solid state Raman material has at least one localized phonon Raman active vibration mode wherein the vibration mode does not change in frequency when varying an angle between a beam projected by the pump laser and a stimulated Raman beam;
 (b) projecting a pump beam from the pump laser into the solid state Raman material to create a stimulated Raman beam, wherein an axis of the pump beam is noncollinear to an axis of the stimulated Raman beam when the stimulated Raman beam completely fills the solid state Raman material, the stimulated Raman beam travels completely across the pump beam within the solid state Raman material, and when the stimulated Raman beam does not completely fill the solid state Raman material the stimulated Raman beam completely separates physically, at some location in the solid state Raman material, from a virtual beam having a same entrance spot size and beam divergence as the stimulated Raman beam, wherein the virtual beam is collinear to the pump beam axis;
 (c) mounting a reflecting device on a second side of the solid state Raman material opposite the first side wherein the reflecting device is connected to reflect the pump beam back through the solid state Raman material as a reflected pump beam and further wherein the reflected pump beam is substantially parallel to the pump beam and spatially offset from the pump beam; and
 (d) containing the Raman laser beam with an optical cavity that reflects at least partially the Raman light to create a noncollinear Raman beam.

14. The method of claim 13 wherein the reflecting device comprises a prism.

15. The method of claim 13 wherein the reflecting device comprises at least two reflective surfaces.

16. The method of claim 13 further comprising the step of:
 (e) mounting a second reflecting device on the first side of the solid state Raman material, wherein the second reflecting device is mounted to reflect the reflected pump beam back through the solid state Raman material as a second reflected pump beam.

17. The method of claim 13 further comprising the step of:
 (d) mounting a second pump laser to project a second pump beam into the Raman material, wherein the second pump beam is projected on an axis different from an axis through which the pump beam is projected.

18. The method of claim 13 wherein the pump laser is mounted to project the pump beam a predetermined distance from an end of the solid state Raman material.

19. The method of claim 13 wherein the pump laser is mounted to project the pump beam through a most narrow dimension of the block of solid state Raman material.

20. The method of claim 13 wherein the pump laser is contained within a light guide, wherein the light guide further contains the solid state Raman material.

21. The method of claim 16 wherein the second reflecting device is aligned to reflect the second reflected pump beam substantially parallel to the reflected pump beam.

22. The method of claim 17 wherein the second pump laser is mounted to project the second pump beam a predetermined distance from the pump beam.

23. The method of claim 17 wherein the pump laser and the second pump laser are Q-switched.

24. A stimulated Raman gain device comprising:
 a solid state Raman material for producing a Raman beam, wherein the material has at least one localized phonon Raman active vibration mode wherein the vibration mode does not change in frequency when varying an angle between a pump beam and the Raman beam;
 means for projecting a pump beam into the solid state Raman material to produce the Raman beam, wherein an axis of the pump beam is noncollinear to an axis of the Raman beam when the Raman beam completely fills the solid state Raman material, the Raman beam travels completely across the pump beam within the solid state Raman material, and when the Raman beam does not completely fill the solid state Raman material the Raman beam completely separates physically, at some location in the solid state Raman material, from a virtual beam having a same entrance spot size and beam divergence as the Raman beam, wherein the virtual beam is collinear to the pump beam axis;
 means for reflecting the pump beam back through the solid state Raman material as a reflected pump beam, wherein the reflected pump beam is substantially parallel to the pump beam and the reflected pump beam is spatially offset from the pump beam; and
 means for containing at least partially the Raman beam in an optical cavity.

25. The Stimulated Raman gain device of claim 24 further comprising:
 a second means for reflecting the reflected pump beam back through the solid state Raman material as a second reflected pump beam.

26. The Stimulated Raman gain device of claim 25 wherein the second means for reflecting is aligned to reflect the second reflected pump beam substantially parallel to the reflected pump beam.

27. The Stimulated Raman gain device of claim 24 further comprising:

means for projecting a second pump beam into the Raman material, wherein the second pump beam is projected on an axis different from an axis through which the pump beam is projected.

28. The Stimulated Raman gain device of claim 24 wherein the means for projecting the pump beam is mounted to project the pump beam a predetermined distance from an end of the solid state Raman material.

29. The Stimulated Raman gain device of claim 24 wherein the means for projecting the pump beam is mounted to project the pump beam through a most narrow dimension of the solid state Raman material.

30. The Stimulated Raman gain device of claim 24 wherein the means for projecting the pump beam comprises a light guide, wherein the light guide further contains the solid state Raman material.

31. The Stimulated Raman gain device of claim 27 wherein the means for projecting the second pump beam projects the second pump beam a predetermined distance from the pump beam.

32. The Stimulated Raman gain device of claim 27 wherein the means for projecting the pump beam and the means for projecting the second pump beam are Q-switched.

33. A stimulated Raman amplifier device comprising:
at least one Raman wavelength light beam projected at the Raman wavelength;
a solid state Raman material for receiving and amplifying the Raman wavelength light beam, wherein the material has at least one localized phonon Raman active vibration mode wherein the vibration mode does not change in frequency when varying an angle between a pump beam and the Raman light beam;
a pump laser connected to project the pump beam into the solid state Raman material to amplify the Raman wavelength light beam, wherein an axis of the pump beam is noncollinear to an axis of the Raman wavelength light beam when the Raman wavelength light beam completely fills the solid state Raman material, the Raman wavelength light beam travels completely across the pump beam within the solid state Raman material, and when the Raman wavelength light beam does not completely fill the solid state Raman material the Raman wavelength light beam completely separates physically, at some location in the solid state Raman material, from a virtual beam having a same entrance spot size and beam divergence as the Raman wavelength light beam, wherein the virtual beam is collinear to the pump beam axis; and
a pump beam reflecting device mounted on a side of the solid state Raman material opposite the pump laser and connected to reflect the pump beam back through the solid state Raman material as a reflected pump beam wherein the pump beam is reflected substantially parallel to the pump beam and spatially offset from the pump beam.

34. The stimulated Raman amplifier device of claim 33 wherein the pump beam reflecting device comprises a prism.

35. The stimulated Raman amplifier device of claim 33 wherein the pump beam reflecting device comprises at least one reflective surface.

36. The stimulated Raman amplifier device of claim 33 further comprising:
a second pump beam reflecting device mounted on a same side of the solid state Raman material as the pump laser is mounted and connected to reflect the reflected pump beam back through the solid state Raman material as a second reflected pump beam.

37. The stimulated Raman amplifier device of claim 33 further comprising:
a second pump laser connected to project a second pump beam into the Raman material, wherein the second pump beam is projected on an axis different from an axis through which the pump beam is projected.

38. The stimulated Raman amplifier device of claim 33 wherein the pump laser is mounted to project the pump beam a predetermined distance from an end of the solid state Raman material.

39. The stimulated Raman amplifier device of claim 33 wherein the pump laser is mounted to project the pump beam through a most narrow dimension of the solid state Raman material.

40. The stimulated Raman amplifier device of claim 33 wherein the pump laser is contained within a light guide, wherein the light guide further contains the solid state Raman material.

41. The stimulated Raman amplifier device of claim 36 wherein the second pump beam reflecting device is aligned to reflect the second reflected pump beam on an axis substantially parallel to the axis through which the pump beam is projected.

42. The stimulated Raman amplifier device of claim 37 wherein the second pump laser is mounted to project the second pump beam a predetermined distance from the pump beam.

43. The stimulated Raman amplifier device of claim 37 wherein the pump laser and the second pump laser are Q-switched.

44. A method for stimulated emission of Raman radiation, said method comprising the steps of:
(a) projecting a pump beam from a pump laser into solid state Raman material to create a stimulated Raman beam, wherein the solid state Raman material has at least one localized phonon Raman active vibration mode that does not change in frequency when varying an angle between the pump beam and a stimulated Raman beam, and wherein an axis of the pump beam is noncollinear to an axis of the stimulated Raman beam when the stimulated Raman beam completely fills the solid state Raman material the stimulated Raman beam travels completely across the pump beam within the solid state Raman material, and when the stimulated Raman beam does not completely fill the solid state Raman material the stimulated Raman beam completely separates physically, at a location in the solid state Raman material, from a virtual beam having a same entrance spot size and beam divergence as the stimulated Raman beam, wherein the virtual beam is collinear to the pump beam axis;
(b) folding the pump beam to cause the pump beam to re-enter the solid state Raman material at least once, wherein each time the pump beam re-enters the solid state Raman material as a reflected pump beam, the reflected pump beam is substantially parallel to the pump beam and spatially offset from the pump beam and any other reflected pump beams; and
(c) containing the Raman laser beam with an optical cavity that at least partially reflects the Raman light to create a compressed noncollinear Raman beam.

* * * * *